(No Model.)
R. T. DRESSLER & V. TIMITCH.
CAR COUPLING.
No. 550,487. Patented Nov. 26, 1895.
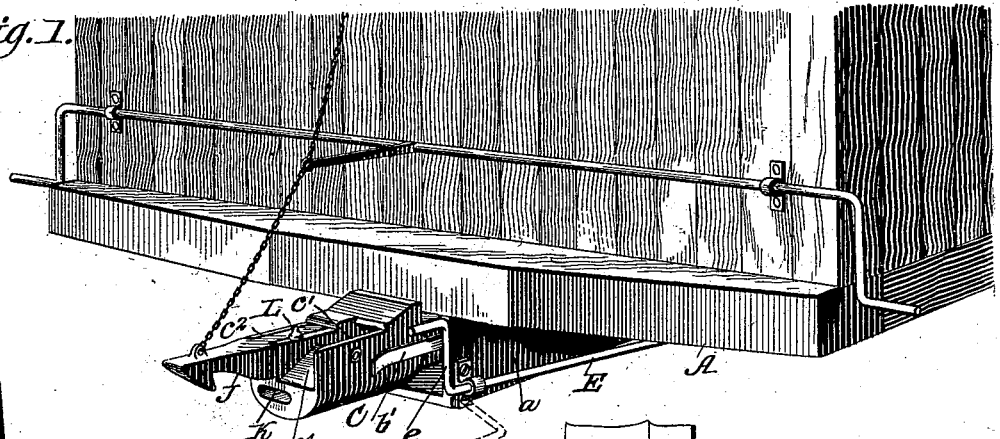
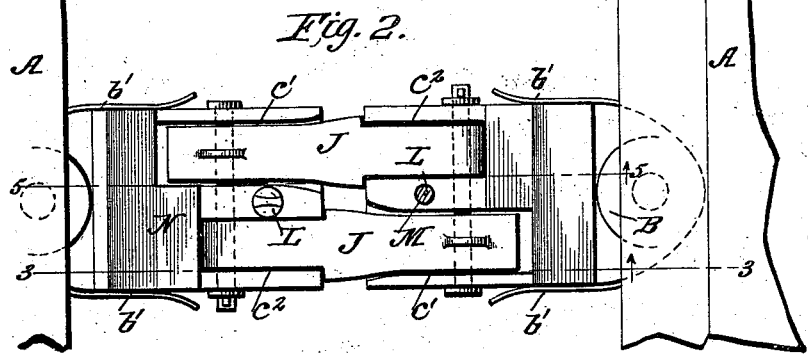
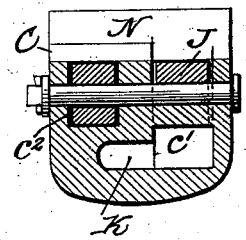
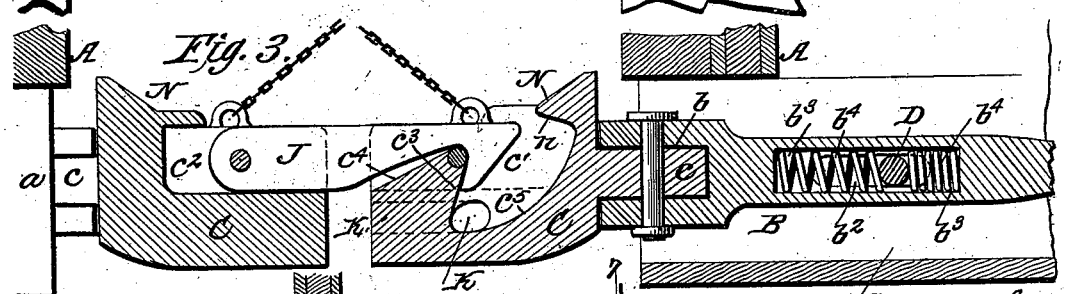
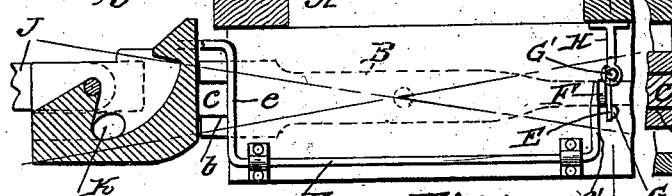
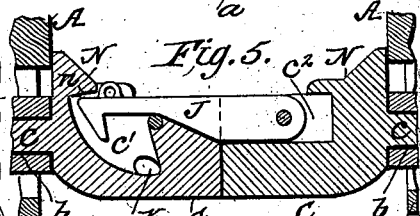
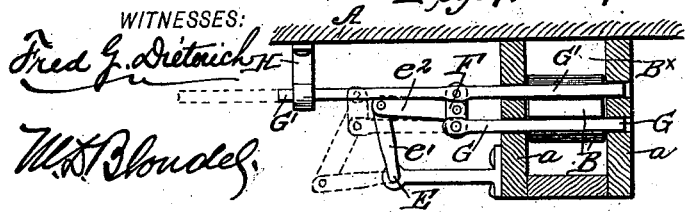
WITNESSES:
Fred G. Dietrich
M. B. Blondel
INVENTORS:
R. T. Dressler.
V. Timitch.
BY
Munn & Co
ATTORNEYS.

UNITED STATES PATENT OFFICE.

ROBERT T. DRESSLER AND VELIMIR TIMITCH, OF HASTINGS, NEBRASKA.

CAR-COUPLING.

SPECIFICATION forming part of Letters Patent No. 550,487, dated November 26, 1895.

Application filed May 28, 1894. Serial No. 512,729. (No model.)

*To all whom it may concern:*

Be it known that we, ROBERT T. DRESSLER and VELIMIR TIMITCH, residing at Hastings, in the county of Adams and State of Nebraska, have invented certain new and useful Improvements in Car-Couplers, of which the following is a specification.

Our invention has for its object to provide a simple and effective car-coupler which will automatically couple when the draw-heads come together, which can be uncoupled from the top or the sides of the car, and in which the coupling members will positively engage and be held from jumping up when they engage.

It has also for its object to provide a coupler having its draw-head pivotally connected with the draw-bar for a horizontal oscillatory movement and the draw-bar pivotally connected to the car-frame and held in engagement with adjusting and locking devices, whereby such bar can be adjusted vertically.

With other objects in view, which will hereinafter be referred to, our invention consists in such peculiar combination and novel arrangement of parts, as will be hereinafter first described in detail, and then be specifically pointed out in the appended claims, reference being had to the accompanying drawings, in which—

Figure 1 is a perspective view of our improved car-coupling. Fig. 2 is a top plan view of two draw-heads constructed in accordance with our invention coupled together. Fig. 3 is a longitudinal section of the same on the line 3 3, Fig. 2. Fig. 4 is a longitudinal section of one of the draw-heads, illustrating the draw-bar adjusting mechanism. Fig. 5 is a longitudinal section on the line 5 5, Fig. 2, showing the draw-heads bumped together. Fig. 6 is a transverse section of one of the draw-heads; and Fig. 7 is a section on the line 7 7, looking in the direction indicated by the arrow.

Referring to the accompanying drawings, A indicates the car-frame, of the usual construction, and B the draw-bar, to the front end of which is pivotally connected to swing laterally the draw-head proper C, such head having an ear or shank $c$, which seats in a socket $b$ in the draw-bar, the head being normally held to project directly forward in line to engage the opposing draw-head by the flat springs $b'$ $b'$, secured to the side walls of the bar B and projected over the shank $c$, as shown.

By referring to Fig. 3 of the drawings, it will be noticed the draw-bar B is held between the timbers $a$ $a$ and is centrally pivoted on a transverse bolt D, which passes through an elongated slot $b^2$ in the bar, the ends of which terminate in recesses or sockets $b^3$, in which are held buffer-springs $b^4$ $b^4$, which engage the bolt at each side. By thus connecting the draw-bar, it will be noticed the same will have the usual longitudinal and spring-resistance movement and be also capable of swinging vertically whereby to adjust its draw-head to different horizontal planes, whereby to adapt the same to couple with draw-heads of different heights.

As a simple and effective means for adjusting the draw-head vertically, we employ the devices most clearly shown in Figs. 4 and 6, which comprise a longitudinally-extending rock-shaft E, the front end of which extends to the front of the car adjacent the draw-head and has a crank-handle $e$, which normally projects up to the position shown in Fig. 1. At the rear end the shaft E has an upwardly-projecting crank-member $e'$, which, through the medium of a pivoted link $e^2$, connects with a plate F, connected at its ends with a pair of rods G G', which project at right angles across the draw-bar chamber or space B$^\times$ and form lock-members which embrace the end of the draw-bar and hold it from vertical movement after it is set as desired; and to form a guide for such arms the arm G' is extended outward and held to slide in a bearing-bracket H, as most clearly shown in Fig. 7.

So far as described, it will be seen that when it is desired to raise or lower the draw-head to set it for use with a higher or lower opposing draw-head, it is only necessary to throw the handle $e'$ down to the position shown in dotted lines in Fig. 1 and then raise or lower the draw-head to the position desired, at which point it will be held locked, when the handle $e$ is moved up again.

The draw-heads C have each a pair of longitudinal seats or channels $c'$ $c^2$, in one of which is pivoted a gravity coupling-link J, held to swing vertically and having the usual coupling-barb at the front end, such channel having a horizontal bottom, whereby the link is held normally at a horizontal position. The opposite seat or channel $c^2$ has a coupling-shoulder $c^3$, the front edge of which is beveled, as at $c^4$, while the bottom $c^5$ inclines downward and forward and opens into an ordinary link-and-pin mortise K, formed in the under part of the draw-head, into which extends the pin L, which passes down through a pin-aperture M, formed in the solid or division wall of the draw-head.

By connecting the seat or channel $c^2$ with the mortise K, such channel will be held free from dirt, snow, and ice which might otherwise accumulate therein, and which in this construction will pass out through the mortise K.

In coupling devices having gravity coupling-links held to freely swing upward, such links frequently, when the draw-heads bump together, after they pass over the coupling-shoulder, fly upward through the jar or coupling shock and fail to couple with such shoulders. To avoid such a defect we form over the rear end of the seat $c^2$ a transverse bridge-piece N, beveled on its under face, as at $n$. This bridge-piece, it will be noticed by reference to Figs. 2, 3, and 6, while being disposed at a point to the rear of the shoulder sufficient to allow for a free uncoupling of the link, is so disposed that as the draw-heads abut the front end of the link will enter under the same, as seen in Fig. 5, and be thereby held from jumping upward.

Any of the ordinary uncoupling devices operated from the top or the sides of the car may be used in connection with our coupling devices, such as, for example, like those shown in Fig. 1.

From the foregoing description, taken in connection with the drawings, it will be seen that our improved coupler comprises a construction in which the draw-head is capable of swinging laterally to accommodate it to the curves of the road, can be quickly adjusted to different heights, the coupling-links held from jumping up, making the coupling action a positive one, and the seat or coupling recess formed so that dirt, ice, and snow cannot accummulate therein, thereby embracing all the essential requirements necessary in couplers of this class.

Having thus described our invention, what we claim, and desire to secure by Letters Patent, is—

1. A car coupling, having a draw-bar provided with a lengthwise slot, a transverse pivot, passing through said slot, buffer springs arranged in the latter in front and rear of the pivot, and means for locking the draw-bar in any of its vertical adjustments, as shown and described.

2. In a car coupling, in combination, with the car frame, of a coupling bar, pivoted to swing vertically, and detent mechanism, including an operating handle extended to the front of the car, arranged to be moved into engagement with the rear end of the said draw bar, to hold it locked from vertical movement substantially as described.

3. The combination with a draw bar pivoted to swing with its ends vertically, of a rock shaft held parallel with the draw bar, having a crank handle at the front end a crank arm at the rear end, lock arms held to move transversely across the rear end of the draw bar, and a link connection between such arms and the said crank arm all arranged substantially as shown and for the purposes described.

4. The combination with the car frame, and the transverse pivot bolt D, of the draw bar B having an elongated slot, fitted over the bolt terminating at its ends in recesses, and buffer springs held in such recesses, and to bear against the bolt, and means for holding the draw bar locked from a swinging motion after it is adjusted to its desired position, substantially as shown and for the purposes described.

5. In a car coupling, having vertically-swinging gravity coupling links and coupling shoulders, a draw-head having a coupling recess and under the same a link-and-pin mortise, which is provided with an opening that communicates with the bottom of such coupling seat, or recess, all substantially as shown, and for the purposes described.

ROBERT T. DRESSLER.
VELIMIR TIMITCH.

Witnesses:
J. H. SPICER,
HATTIE SNODGRASS.